(12) United States Patent
Harris

(10) Patent No.: US 10,197,271 B2
(45) Date of Patent: Feb. 5, 2019

(54) COMBUSTION APPARATUS FOR COMBUSTING RECYCLABLE OR WASTE MATERIAL

(71) Applicant: MGH Burners Limited, Gawber, Barnsley (GB)

(72) Inventor: Michael Harris, Doncaster (GB)

(73) Assignee: MGH Burners Limited, Barnsley (GB)

( * ) Notice: Subject to any disclaimer, the term of this patent is extended or adjusted under 35 U.S.C. 154(b) by 417 days.

(21) Appl. No.: 14/917,661

(22) PCT Filed: Sep. 9, 2014

(86) PCT No.: PCT/GB2014/052724
§ 371 (c)(1),
(2) Date: Mar. 9, 2016

(87) PCT Pub. No.: WO2015/033170
PCT Pub. Date: Mar. 12, 2015

(65) Prior Publication Data
US 2016/0223195 A1    Aug. 4, 2016

(30) Foreign Application Priority Data
Sep. 9, 2013   (GB) .................................. 1315979.3

(51) Int. Cl.
*F23G 5/12*     (2006.01)
*F23G 5/44*     (2006.01)
(Continued)

(52) U.S. Cl.
CPC ................ *F23G 5/12* (2013.01); *F23C 7/002* (2013.01); *F23G 5/32* (2013.01); *F23G 5/442* (2013.01);
(Continued)

(58) Field of Classification Search
CPC . F23G 5/12; F23G 5/008; F23G 5/442; F23G 5/32; F23G 2203/403; F23J 1/00; F23C 7/002
See application file for complete search history.

(56) References Cited

U.S. PATENT DOCUMENTS 1,910,735 A     5/1933  Zikesch
3,397,677 A *   8/1968  Moegling ................. F01K 7/18
                                                          122/2
(Continued)

FOREIGN PATENT DOCUMENTS

GB     1348860       3/1974
GB     2290603       1/1996
GB     2303201 A    12/1997

OTHER PUBLICATIONS

PCT Search Report dated Jan. 14, 2015 of Patent Application No. PCT/GB2014/052724 filed Sep. 9, 2014.
(Continued)

*Primary Examiner* — David J Laux
(74) *Attorney, Agent, or Firm* — Maine Cernota & Rardin

(57) ABSTRACT

Disclosed is an apparatus for combusting recyclable or waste material. The apparatus comprises a cylindrical combustion chamber. The chamber comprises a first inlet in a side wall. The first inlet is in communication with a blower and an ignition means. The chamber also comprises a second inlet in a first end wall or a side wall. The second inlet is in communication with a source of recyclable or waste material. The chamber also comprises an outlet in a second end wall on a central axis of the chamber. The longitudinal axis of the first inlet is offset from the central axis of the chamber. In use, the blower forces the recyclable or waste material to circulate around the inside of the chamber.

15 Claims, 1 Drawing Sheet

(51) Int. Cl.
   *F23C 7/00*   (2006.01)
   *F23J 1/00*   (2006.01)
   *F23G 7/10*   (2006.01)
   *F23G 5/46*   (2006.01)
   *F23G 5/32*   (2006.01)

(52) U.S. Cl.
   CPC .............. *F23G 5/46* (2013.01); *F23G 7/105* (2013.01); *F23J 1/00* (2013.01); F23G 2203/30 (2013.01); F23G 2203/403 (2013.01); F23G 2205/121 (2013.01); F23G 2206/203 (2013.01); F23J 2700/003 (2013.01); F23K 2203/202 (2013.01); Y02E 20/12 (2013.01)

(56) References Cited

U.S. PATENT DOCUMENTS

| | | |
|---|---|---|
| 3,727,563 A | 4/1973 | Hasselbring et al. |
| 3,758,261 A | 9/1973 | Galliano, Jr. |
| 3,817,192 A | 6/1974 | Watterback |
| 4,565,137 A | 1/1986 | Wright |
| 4,624,181 A | 11/1986 | Anderson |
| 4,671,192 A | 6/1987 | Hoffert et al. |
| 5,022,329 A | 6/1991 | Rackley et al. |
| 5,209,187 A | 5/1993 | Khinkis |
| 5,765,488 A | 6/1998 | Vatsky |
| 6,021,724 A | 2/2000 | Dahl et al. |
| 2006/0265954 A1 | 11/2006 | Dogru et al. |
| 2013/0089470 A1 | 4/2013 | Takafuji |
| 2013/0101944 A1 | 4/2013 | Supandi |

OTHER PUBLICATIONS

GB Search Report dated Nov. 5, 2014 of Patent Application No. GB1315979.3 filed Sep. 9, 2013.
EPO Communication Pursuant to Article 94(3) EPC for Appl No. 14787242.8 dated Sep. 28, 2017.
EPO Communication Under Rule 71(3) EPC for Appl No. 14787242.8 dated Apr. 18, 2018.

* cited by examiner

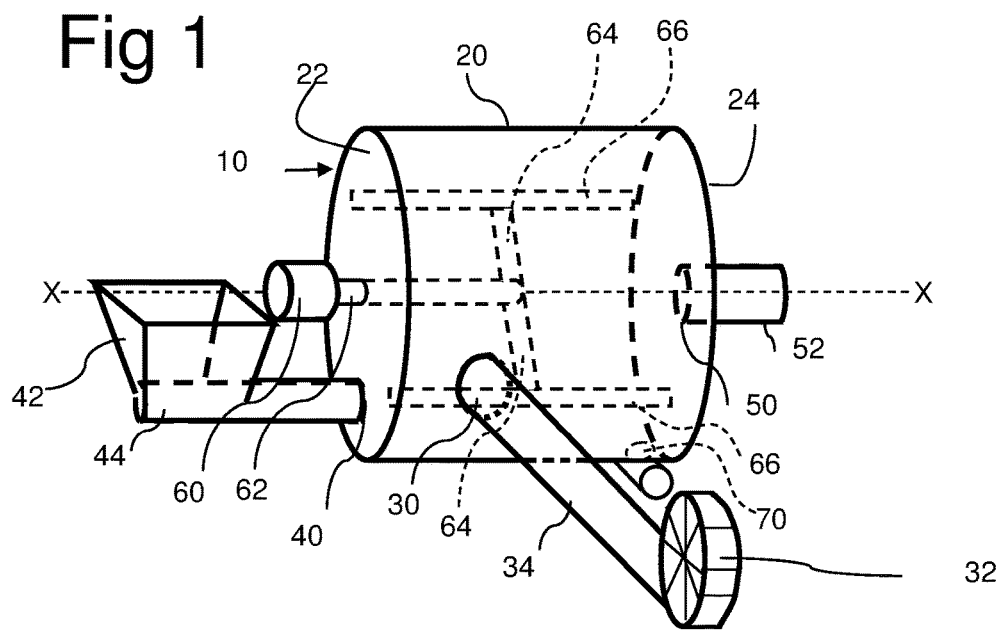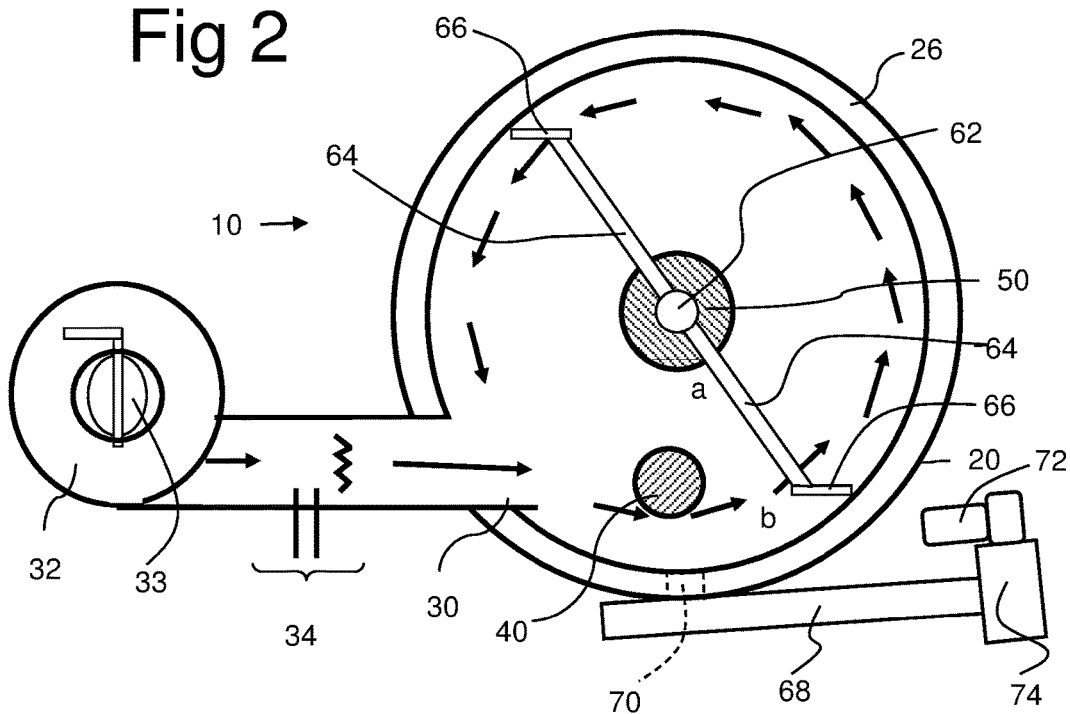

COMBUSTION APPARATUS FOR COMBUSTING RECYCLABLE OR WASTE MATERIAL

RELATED APPLICATIONS

This application is a national phase application filed under 35 USC § 371 of PCT Application No. PCT/GB2014/052724 with an International filing date of Sep. 9, 2014, which claims priority to GB1315979.3, filed Sep. 9, 2013. Each of these applications is herein incorporated by reference in their entirety for all purposes.

FIELD OF THE INVENTION

The present invention relates to recycling and, more specifically to apparatuses for the combustion of recyclable or waste material.

Background of the Invention

The generation of waste is a great burden to society and infrastructure. Governments are being required to manage both domestic and commercial waste on massive scales in a manner that is sustainable over the long term. The task of dealing with the vast variety of materials in an efficient manner is therefore a challenging one.

One of the main problems when handling domestic and commercial waste materials is the generation of toxic and/or hazardous compounds which originate from the materials themselves and/or residual compounds contained within the waste. Initial processing of these materials liberates these compounds and can facilitate secondary reactions which produce further harmful compounds. This problem is exemplified when handling waste construction industry fibre board. During the initial processing the fibre board is particulated, thereby exposing the harmful adhesives and preservatives contained within the board products.

Conventional management schemes involve deposition within landfill sites. This is not sustainable in the long term and has environmental consequences. Other schemes involve large scale incineration to generate electricity, but this often leads to large emissions of harmful gases.

There has now been developed an apparatus for combusting recyclable or waste material which overcomes or substantially mitigates the above-mentioned and/or disadvantages associated with the prior art.

SUMMARY OF THE INVENTION

In a first aspect of the invention there is provided an apparatus for combusting recyclable or waste material, the apparatus comprising a cylindrical combustion chamber, the chamber comprising a first inlet in a side wall, the first inlet in communication with a blower and an ignition means, a second inlet in a first end wall or a side wall, the second inlet in communication with a source of recyclable or waste material, and an outlet in a second end wall on a central axis of the chamber, wherein the longitudinal axis of the first inlet is offset from the central axis of the chamber, and in use, the blower forces the recyclable or waste material to circulate around the inside of the chamber.

The apparatus according to the invention is advantageous principally because the blower forces in large amounts of air into the apparatus therefore resulting in large amounts of oxidation of the waste or recyclable material during the combustion process. The blower also forces the materials to circulate within the chamber and this not only completely mixes the waste or recyclable material materials, but forces the heavier less combusted elements towards the inside of the chamber wall. A gradient of particle weight is set up within the apparatus, such that the light combusted material (ash/gas etc.) moves towards the axis of rotation and then out of the outlet, whereas the heavier un-combusted materials remain close to the walls of the chamber. Overall this results in an efficient combustion process at very high temperatures with minimal solid residue remaining. Due to the high temperatures created in use, most toxic and/or harmful materials which would otherwise be released from waste or recyclable materials during processing are significantly eliminated. Therefore the apparatus can be used to combust waste or recyclable materials which are otherwise hazardous to dispose of.

The apparatus according to the invention may be adapted for the combustion of any type of recyclable or waste material, such as domestic or commercial waste, but is particularly advantageous in relation to the combustion of timber or timber composite materials, such as fibre-board.

The combustion chamber is preferably formed from side wall and two opposing ends. The chamber can be formed from any non-combustible material capable of withstanding the combustion temperatures generated in use. Preferably the chamber is formed from steel or the like. The combustion chamber can comprise a refractory lining capable of protecting the chamber from the high temperatures generated in use. Preferably the chamber is manufactured with a lining of non-combustible material. The non-combustible lining material preferably comprises a heat resistant cement, ceramic, asbestos, or the like. The combustion chamber can also comprise an insulation layer. Preferably the insulation layer comprises a layer of inert gas, a layer of air, or a layer of insulation material. The combustion chamber generally comprises a longitudinal central axis, one or more side walls and two opposing end walls. Preferably the walls of the chamber are welded or otherwise sealed together.

The first inlet in a side wall of the chamber preferably comprises an opening. The blower preferably comprises a fan or turbine or the like. Preferably, air or the like is blown by the blower into the chamber via the first inlet. The blower can be attached directly to the outside of the chamber over the opening. In such an embodiment, the blower defines a passageway for air into the chamber from the blower. The blower can also be attached to the outside of the chamber via a housing positioned over the opening. In such an embodiment, the housing defines a passageway for air into the chamber from the blower. The blower preferably comprises a damper or the like to control the flow of air or the like into the chamber.

The ignition means preferably comprises a fuel and a lighter capable of being combined and activated when the ignition means is switched on. The ignition means preferably comprises a fuel and a lighter capable of being decombined and deactivated when the ignition means is switched off. The fuel preferably comprises a flammable or inflammable liquid, solid or gas. The lighter preferably comprises a heating element, a spark generator, pilot light, flame or the like. The ignition means preferably generates primary combustion products when it is switched on. The primary combustion products can be anything that initiates combustion of the recyclable or waste material. Preferably the primary combustion products are any of combustion gases, heat, and/or a flame. The ignition means can be integral with the blower. In a further embodiment, the ignition means preferably comprises a secondary device in communication with the passage way defined by the blower. The blower preferably blows air over the ignition means. The air or the like which is blown by the blower into the chamber via the first inlet, is preferably in communication with the ignition means before it enters the chamber.

The second inlet in a first end wall or a side wall of the chamber preferably comprises an opening. The opening preferably defines a passageway for recyclable or waste material. The source of recyclable or waste material can be a storage vessel, such as a hopper or the like. The storage vessel is preferably capable of being filled or topped up either manually or by machine. The source of recyclable or waste material can also be a recycling or waste disposal plant or the like. The source of recyclable or waste material may comprise a conveyor for conveying the recyclable or waste material to the chamber via the second inlet. The conveyor is preferably a screw conveyor, such as an auger or the like, or a linear conveyor such as a conveyor belt or the like. The conveyor may be integral with the passageway.

The outlet preferably comprises an opening in an end wall of the chamber. Preferably the opening defines a passageway for the exit of combustion products, such as exhaust gases, from the chamber. An exhaust can be attached to the exterior of the chamber over the outlet. The exhaust preferably comprises a tubular member formed from any non-combustible material capable of withstanding the combustion temperatures in use. Preferably the exhaust is lined with refractory material, such as that described above. The exhaust preferably communicates the combustion products away from the chamber.

In a preferred embodiment apparatus is connected to a secondary device. The secondary device preferably utilises the energy produced by the apparatus. The secondary device preferably comprises a heat exchanger, a turbine, or a smelting plant. The heat exchanger can be connected to the source of waste or recyclable material in order to dry the material in use before it enters the chamber. The heat exchanger can for example be a heat exchanger for a conventional hot water heating system or for a power station.

In a further preferred embodiment the walls of the chamber comprise a heat exchanger.

Preferably the longitudinal axis of the first inlet is directed away from the central axis of the chamber. More preferably the longitudinal axis of the first inlet is substantially parallel with the side wall of the chamber where the first inlet is positioned. The longitudinal axis of the first inlet can also be substantially tangential with the side wall of the chamber.

In use, the ignition means is switched on and the primary combustion products of the ignition means are preferably blown into the chamber via the first inlet by the air or the like from the blower. Recyclable or waste material is preferably delivered into the chamber from the source by the conveyor via the second inlet. Recyclable or waste material may also be delivered into the chamber via the second inlet, directly (i.e. poured straight in without using the conveyor). The recyclable or waste material is preferably ignited by contact with the primary combustion products of the ignition means. Preferably the source of recyclable or waste material within the first inlet and blower at the second inlet create seal to prevent combustion products escaping from those areas. The action of the air or the like from the blower within the chamber preferably forces the recyclable or waste material and/or the primary combustion products to circulate around the inside of the chamber. In a preferred embodiment, the circulation of material within the chamber is in a substantially uniform direction. The circulation of material within the inside of the chamber is preferably around the longitudinal axis of the chamber. The action of the primary combustion products on the recyclable or waste material preferably causes the recyclable or waste material to ignite and combust. Combusted material preferably exits the chamber through the outlet. Once combustion of the recyclable or waste material has begun, preferably the ignition means is switched off. Further recyclable or waste material is preferably fed into the chamber via the second inlet. In this way preferably the resultant combustion is self-sustaining.

A preferred embodiment of the invention will now be described in greater detail, by way of illustration, with reference to the accompanying drawings.

BRIEF DESCRIPTION OF THE DRAWINGS

FIG. 1 is a perspective view of an embodiment of an apparatus according to the invention FIG. 2 is a schematic view of an embodiment of the apparatus according to the invention through line X-X in FIG. 1.

DETAILED DESCRIPTION

FIG. 1 shows a perspective view of the apparatus according to the invention. The apparatus is generally designated 10 and comprises a cylindrical chamber 20 which has a longitudinal central axis X-X, and a circular cross section. The chamber 20 is made of steel and the cylindrical side wall is welded to the first end wall 22, while the second end wall 24 is mounted on hinges and held closed on the end of the cylinder by bolts (not shown). In this way, the chamber can be opened up for maintenance or cleaning.

In the side wall of the chamber 20 there is a first inlet 30 which is connected to a blower 32, suitably a centrifugal fan having a rotatable vane 33 in its inlet to enable the air flow to be controlled. Between the blower 32 and the chamber 20 is an igniter 34. In the first end wall 22 there is disposed a second inlet 40 which is connected to a steel hopper 42. At the base of the hopper 42 there is an auger 44 which extends into the second inlet 40. In the second end wall 24 of the chamber 20 there is an outlet 50. The outlet 50 is connected to a steel exhaust 52.

FIG. 2 shows a schematic view of the apparatus 10 according to the invention through line X-X. The chamber 20 comprises a refractory lining 26 which is capable of withstanding the temperatures generated inside the chamber. The lining 26 is refractory cement which is fabricated to adhere to the inside of the chamber. The outlet 50 and the exhaust 52 are also lined with a lining of refractory cement (not shown).

In use the hopper 42 (in FIG. 1) is filled with recyclable or waste material. The igniter 34 and the blower 32 are then switched on. The igniter 34 in the illustrated embodiment is a diesel oil burner. Combustion products from burning the oil are forced into the chamber 20 through the inlet 30 by the air from the blower 32. At the same time, the auger 44 is switched on and this transfers the recyclable or waste material in the hopper 42 into the lower part of the chamber 20 via the inlet 40. The recyclable or waste material and the primary combustion products are forced to rotate around the inside of the chamber 20 in the direction generally shown by the arrows in FIG. 2. The direction of rotation is around the axis X-X which runs in and out of the page in FIG. 2. The recyclable or waste material begins to burn. Heavy unburnt material is pushed by centrifugal force to the outside of field of rotation (i.e. close to the refractory lining 26), whilst completely burnt material is found closer to the axis X-X. In use a gradient of particle weight is set up from position "a" to position "b" in FIG. 2. The gradient is generally heavier less combusted materials away from the longitudinal axis of the chamber, and lighter more combusted materials towards the longitudinal axis of the chamber. The air from the blower not only blows the materials around the chamber, but forces them to mix completely. The air also supplies excess oxygen for complete oxidation of the recyclable or waste material during the combustion process.

Recyclable or waste material continues to be fed into the chamber 20 and after a time the igniter 34 is turned off, and the apparatus 10 will continue to combust the recyclable or waste material in a self-sustaining manner (i.e. with no additional combustion means applied). At this point the only input into the chamber 20 is air from the blower 32 and recyclable or waste material from the hopper 42. The combustion products exit the chamber 20 through the outlet 50. The exhaust 52 carries the combustion products a safe distance away. Temperatures of between 1200° C. and 1500° C. have been reached during operation of the apparatus according to the invention and it has been estimated that if the apparatus was connected to a power station, burning 10 tonnes per hour of waste material would produce enough high pressure super-heated steam to drive a 10 megaWatt generator.

Certain types of waste materials can give rise to residues in the combustion chamber that require additional measures to remove. For example, materials such as medium density fibreboard (MDF) and chipboard contain resins that bond the fibres together. While most of the resin will be combusted, there is a possibility of a build-up of some material around the periphery of the chamber. To reduce this, the apparatus may be provided with a rotary scraper arrangement comprising an electric motor 60 driving a shaft 62 passing through the centre of the first end wall, the shaft 62 mounting an opposed pair of radial arms 64, each carrying on its end a scraper blade 66 which contacts the inner surface of the chamber, rotation of the shaft causing the blades to scrape any residue from the surface and reintroduce it into the swirling combustion gases to complete its combustion. The other type of residue which can be associated with waste wood products, for example, is metallic or glass particles which are too heavy to be carried out of the chamber with the combustion gases, instead tending to fall to the lower-most part of the chamber. In order to remove these particles, a second auger 68 is provided, communicating with an opening 70 in the lowermost part of the cylindrical wall of the chamber 20. The auger is driven by an electric motor 72 through a reduction gearbox 74, and is angled slightly upwardly so that the auger remains filled with the particles, thereby providing a gas-tight and heat-resisting seal. The removed particles are deposited from the upper end of the auger.

The invention claimed is:

1. An apparatus for combusting recyclable or waste material, the apparatus comprising:
    a cylindrical combustion chamber having a horizontal longitudinal axis, the combustion chamber comprising a first inlet in a side wall, the first inlet in communication with a blower and an ignition means wherein the longitudinal axis of the first inlet is offset from the central axis of the chamber;
    a second inlet in a first end wall, the second inlet in communication with a source of recyclable or waste material via a first auger wherein the first auger transfers recyclable or waste material directly into the cylindrical combustion chamber via the second inlet;
    an outlet in a second end wall on a longitudinal central axis of the combustion chamber; and
    a second, upwardly-angled auger in operative communication with an opening in a lower-most, cylindrical portion of the combustion chamber, and
    wherein, in use, the blower forces the recyclable or waste material to circulate around the inside of the combustion chamber.

2. The apparatus according to claim 1, wherein the combustion chamber comprises a refractory, non-combustible lining.

3. The apparatus according to claim 2, wherein the lining is a heat resistant cement, ceramic, asbestos, or the like.

4. The apparatus according to claim 1, wherein the combustion chamber comprises an insulation layer.

5. The apparatus according to claim 1, wherein the ignition means generates primary combustion products when switched on.

6. The apparatus according to claim 5, wherein the recyclable or waste material is ignited by contact with the primary combustion products.

7. The apparatus according to claim 1, wherein the ignition means is integral with the blower.

8. The apparatus according to claim 1, wherein an exhaust is attached to the exterior of the combustion chamber over the outlet.

9. The apparatus according to claim 8, wherein the exhaust is lined with a refractory material.

10. The apparatus according to claim 1, wherein the apparatus is connected to a secondary device which utilizes the energy produced by the apparatus.

11. The apparatus according to claim 10, wherein the secondary device comprises a heat exchanger, a turbine, or a smelting plant.

12. The apparatus according to claim 1, wherein the walls of the combustion chamber comprise a heat exchanger.

13. The apparatus according to claim 1, wherein the longitudinal axis of the first inlet is directed away from the central axis of the combustion chamber.

14. The apparatus according to claim 13, wherein the longitudinal axis of the first inlet is substantially parallel with the side wall of the combustion chamber where the first inlet is positioned.

15. The apparatus according to claim 1, wherein the longitudinal axis of the first inlet is substantially tangential with the side wall of the combustion chamber.

* * * * *